(12) United States Patent
Bates et al.

(10) Patent No.: US 11,797,519 B2
(45) Date of Patent: Oct. 24, 2023

(54) ATOMIC CAPTURE OF A SET OF RELATED FILES, USING A DISTRIBUTED LEDGER, FOR PROOF OF AUTHENTICITY

(71) Applicant: Attestiv Inc., Natick, MA (US)

(72) Inventors: John W. Bates, Mendon, MA (US); Thomas Mark Morley, Dedham, MA (US); Emmanuel Parasirakis, Norwood, MA (US); Nicos Vekiarides, Natick, MA (US)

(73) Assignee: Attestiv Inc., Natick, MA (US)

( * ) Notice: Subject to any disclaimer, the term of this patent is extended or adjusted under 35 U.S.C. 154(b) by 644 days.

(21) Appl. No.: 16/445,478

(22) Filed: Jun. 19, 2019

(65) Prior Publication Data

US 2020/0012806 A1    Jan. 9, 2020

Related U.S. Application Data

(60) Provisional application No. 62/688,830, filed on Jun. 22, 2018, provisional application No. 62/688,845, filed on Jun. 22, 2018.

(51) Int. Cl.
*G06F 16/23* (2019.01)
*G06F 9/451* (2018.01)
(Continued)

(52) U.S. Cl.
CPC ...... *G06F 16/2379* (2019.01); *G06F 3/04817* (2013.01); *G06F 3/04842* (2013.01);
(Continued)

(58) Field of Classification Search
CPC ...... G06F 16/2379; G06F 9/451; G06F 16/27; G06F 16/13; G06F 3/04817;
(Continued)

(56) References Cited

U.S. PATENT DOCUMENTS

| 9,300,678 B1 | 3/2016 | Stack et al. |
| 10,163,080 B2 | 12/2018 | Chow et al. |

(Continued)

FOREIGN PATENT DOCUMENTS

WO    2018115992 A1    6/2018

OTHER PUBLICATIONS

International Search Report and Written Opinion dated Sep. 20, 2019 for Related PCT/US19/37879.

*Primary Examiner* — Oleg Korsak
(74) *Attorney, Agent, or Firm* — VLP Law Group LLP; David J. Thibodeau, Jr.

(57) ABSTRACT

Techniques for proving authenticity of data files, such as digital photos. An authentication/indexing server content from a client device such as a mobile device, and generates or receives other related data such as a reference to the content object, a fingerprint for the content object, and other metadata indicating for example a timestamp related to the content object. The fingerprint is inserted into a distributed ledger, with the distributed ledger returning a ledger address. A manifest object containing the transaction object, the ledger address, and a list of the content object and, optionally, related edits is then created and stored. The server may index fingerprints. Thus, a fingerprint can be used to authenticate subsequently received object against the stored metadata.

17 Claims, 14 Drawing Sheets

(51) Int. Cl.
*G06F 3/04842* (2022.01)
*G06F 3/04817* (2022.01)
*G06F 16/27* (2019.01)
*G06N 20/00* (2019.01)
*G06F 16/13* (2019.01)
*G06F 21/62* (2013.01)
*H04W 12/06* (2021.01)
*H04L 67/1097* (2022.01)
*H04L 67/01* (2022.01)

(52) U.S. Cl.
CPC .............. *G06F 9/451* (2018.02); *G06F 16/13* (2019.01); *G06F 16/27* (2019.01); *G06F 21/6227* (2013.01); *G06N 20/00* (2019.01); *H04W 12/06* (2013.01); *H04L 67/01* (2022.05); *H04L 67/1097* (2013.01)

(58) Field of Classification Search
CPC . G06F 3/04842; G06F 21/6227; G06N 20/00; H04W 12/06
See application file for complete search history.

(56) References Cited

U.S. PATENT DOCUMENTS

| | | | |
|---|---|---|---|
| 10,560,261 B1* | 2/2020 | Crawforth | H04L 65/601 |
| 10,694,070 B2* | 6/2020 | Tokuchi | H04N 1/00143 |
| 2016/0241532 A1 | 8/2016 | Loughlin-McHugh et al. | |
| 2017/0300905 A1 | 10/2017 | Withrow et al. | |
| 2018/0082043 A1* | 3/2018 | Witchey | G16H 10/40 |
| 2018/0137512 A1* | 5/2018 | Georgiadis | H04L 9/3239 |
| 2018/0189345 A1 | 7/2018 | Azoulay | |
| 2018/0285996 A1* | 10/2018 | Ma | H04L 9/3236 |
| 2018/0315145 A1* | 11/2018 | Darnell | H04L 9/3239 |
| 2019/0109834 A1 | 4/2019 | Lyons et al. | |
| 2019/0391972 A1* | 12/2019 | Bates | G06F 16/13 |
| 2020/0082106 A1* | 3/2020 | Fox | H04L 63/101 |
| 2020/0103894 A1* | 4/2020 | Cella | G05B 23/0264 |
| 2020/0411151 A1* | 12/2020 | Puleo | G16H 10/60 |
| 2021/0082044 A1* | 3/2021 | Sliwka | G06Q 20/38215 |
| 2021/0327565 A1* | 10/2021 | Buckland | G16H 10/60 |
| 2022/0021711 A1* | 1/2022 | Marsh | G06F 16/90335 |

* cited by examiner

ATOMIC CAPTURE OF A SET OF RELATED FILES, USING A DISTRIBUTED LEDGER, FOR PROOF OF AUTHENTICITY

CROSS REFERENCE TO RELATED APPLICATIONS

This application claims priority to U.S. Provisional Application No. 62/688,830 filed Jun. 22, 2018 entitled "ATOMIC CAPTURE OF A SET OF RELATED FILES, USING A DISTRIBUTED LEDGER, FOR PROOF OF AUTHENTICITY" and also claims priority to U.S. Provisional Application No. 62/688,845 filed Jun. 22, 2018 entitled "REAL TIME VISUAL VALIDATION, USING A DISTRIBUTED LEDGER, OF IMAGES VIDEOS AND/OR DOCUMENTS VIA SMART RENDERING", the entire contents of each of which are incorporated by reference herein.

BACKGROUND

In industry, government, and personal workflows, there is an increasing requirement for captured content, e.g. photos, audio, and video, to be provable and auditable. A large number of applications ranging from the traditional content tools like Photoshop to the increasingly eerie DeepFake demonstrations have demonstrated the ability to modify and create content that easily convince the end-user of their reality.

In the face of such tools, the risk of deception, fraud, and general misrepresentation rises substantially.

SUMMARY

At a high level, the approach here includes an application program that communicates with an authentication server to access manage and validate digital assets such as images. When retrieving images, the application may communicate with a separate asset data store located either alongside the server or elsewhere, such as on another storage server or in a cloud storage service. The server also communicates with an immutable distributed ledger to retrieve metadata, including fingerprints, for protected assets. Communication with the immutable distributed ledger may occur over the Internet or other network.

For example, a method performed by authentication server may include receiving a transaction object from a mobile device. The transaction object includes at least a reference to a content object, a fingerprint for the content object, and other metadata indicating at least a timestamp related to the content object. The fingerprint for the transaction object is inserted into a distributed ledger, with the distributed ledger returning a ledger address. S manifest object containing the transaction object, the ledger address, and a list of the content object and, optionally, related edits is then created and stored.

Content objects may be stored in authentication server, but more generally, are stored in an object repository accessible locally to the authentication server, or as private storage managed remotely from the authentication server, or via a cloud storage service. The fingerprints may also be stored with the content object in the object repository.

The content object can be subsequently located by sending the ledger address to the distributed ledger, receiving a fingerprint from the distributed ledger, sending the fingerprint to look up the object in the object repository.

In some implementations, it is preferred that any edits to content objects are included within its associated content or transaction object. For example, when the transaction object includes an image object, a transformed image object that is a cropped or scaled version of the image content object, and a fingerprint for the transformed object, are also included in the transaction object.

Content objects may include sets of related videos or audio recordings, sets of related documents, sets of structured or unstructured user input data, or combinations.

Metadata may include machine generated metadata for a content object related to a time, location, user identifier, contextual data such as environmental data, weather, or nearby events related to when the content object was captured. Metadata can also further include machine readable information generated from the content object. These additional content objects may be generated by applying text detection, optical character recognition, object detection or other artificial intelligence/machine learning to a content object. Content objects may be captured and/or edited individually, or via a structured workflow.

The server may include abstraction layers to interface with multiple object repository types or distributed ledger types.

DESCRIPTION OF PREFERRED EMBODIMENTS

What is needed is a way to provide proof of authenticity of digital content, such as photos, audio, video, and documents, to make it possible to "trust one's own eyes".

An approach we call "Attestiv" solves the problem of fraudulent/deceptive content presentation by aggressively fingerprinting content at the point of or near the point of creation. The approach further maintains a strict chain of custody for content. The approach also permits integration with existing user-guided workflows, to further ensure easy and non-intrusive addition of verifiable content capture and creation.

In some instances, the approach can actually improve customer workflows by generating additional content based on Artificial Intelligence (AI) and/or Machine Learning (ML) techniques such as text detection, optical character recognition, visual object detection, and the like. Also, custom configurations can include data supplied via an HTML-based form to be embedded in the workflow.

System Architecture

Figure 1:
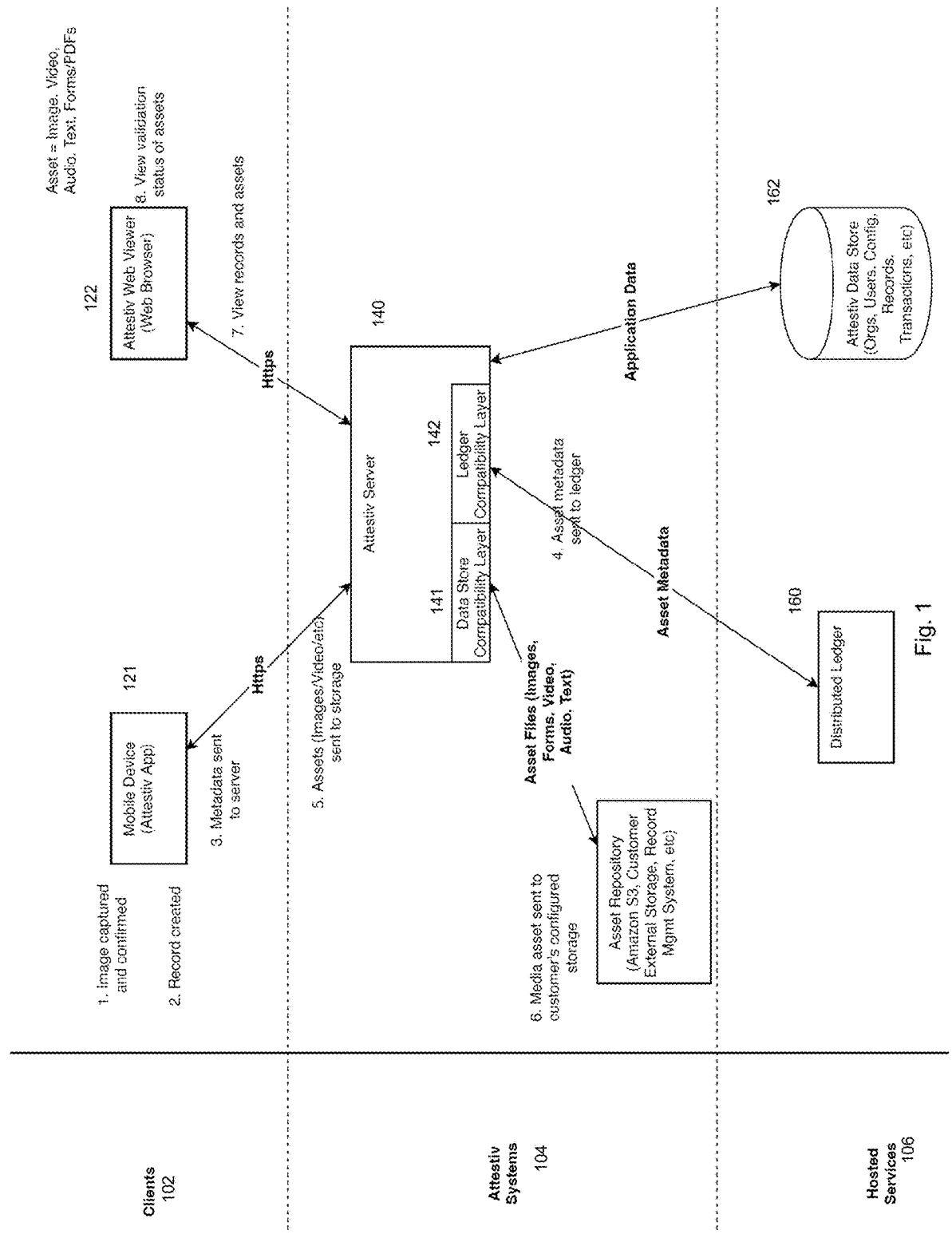
FIG. 1 is an example high-level system architecture.

FIG. 1 is an example high-level system architecture for Attestiv, including client applications 121, 122 (such as a mobile application or a web viewer application), a server 140 (referred to herein as the Attestiv server) which performs authentication, indexing, and other functions, an asset repository 148, a distributed ledger 160, and a database 162.

With brief reference to the other figures that will be discussed in more detail below, the platform allows for capture 202 of digital assets 220 (such as photos 221, forms/pdfs 225, video 223, audio 222, and text 224) to be provable. It does this by determining a fingerprint 734 for the asset data along with other optional metadata 736, 738, 739 information and storing it 720 (at least the fingerprint metadata) in a distributed ledger/blockchain 160. This metadata, once written on the distributed ledger, is unmodifiable. In order to validate an asset 1018, 1100, the original asset's fingerprint can be regenerated 1108 and compared against the fingerprint retrieved from the ledger 1030, 1112. In addition to the metadata, the actual content 710 can also be sent to the Attestiv server where it will then be forwarded to a preconfigured asset repository. The repository can be the customer's servers, an secure FTP server, a cloud provider's storage like S3 or Dropbox, or some other storage device or service.

Application and Data Flow

In general, the flow is that a user first creates or otherwise locates digital media content (e.g., takes a picture, fills out a form, answer a questionnaire, etc.) 300 and then submits the digital content to the server 140 as an asset. This step is typically done within an Attestiv mobile application 121 (also 800 in FIG. 8). (Although applications and devices are referred to herein as "mobile", it should be understood that the term "mobile" includes not just smartphones, but also personal assistants, tablets, laptops and other portable data processing devices that include a camera or other peripherals for collecting or locating digital files). The mobile app 121 may typically execute a guided workflow for collecting digital assets (images, audio, video, documents). For example, a guided flow may atomically direct a user through a series of steps to be performed by an insurance agent during inspection of an automobile accident scene. In that self-service guided workflow, the user may be asked to take images of different parts of the vehicles involved, take a witness statement via an audio recording, and snap a picture of a police report. Other types of guided workflows can be implemented for other self-inspection applications.

It should therefore be understood that the protected assets may include many different types of digital media, such as digital photos, documents, web pages, videos, audio clips, downloaded images, etc., that may 220 or may not 230 have been originally created by the user.

That data 720 is then sent to the Attestiv server in a record 720, 802 (the record created may be a collection of one or more assets). Metadata associated with the media 730-1, 730-2, 732, 734, 736, 738, 739 (including at least a media fingerprint 734) is also sent. The metadata will then be published to the distributed ledger. The ledger will return the address 712-3 on the blockchain to the Attestiv server where that metadata is stored.

The actual content/assets are also sent to the Attestiv server and stored. In the case of media, it may end up in a repository provided via a cloud storage service such as Amazon S3, or it may end up on the customer's own private storage resources. This final location may be decided by the customer at the time of signing up with a service that provides access to Attestiv and will be part of their organization's configuration. The Attestiv server 140 will add the new ledger address to its repository. This repository of metadata is also used by the server for building up an index. The metadata may contain information such as a fingerprint of the data, location, time, weather, etc. The fingerprint can, for example, be indexed along with the blockchain address so that the metadata can later be found on the blockchain given just the asset. It is also possible, in some implementations, to also add indexing or even other metadata properties in order to assist with other types of searches.

An alternative approach has the mobile application directly writing the metadata to the distributed ledger (as indicated by the dashed lines in FIG. 1). This approach eliminates the need for the Attestiv server to be a "middleman" and a possible point of data manipulation. There are pros and cons to either approach. Writing the metadata via the server provides better reliability, whereas writing directly to the ledger provides a higher level of security. In either case, the end result is the same, with the metadata ending up on the ledger and the Attestiv server managing the ledger address, asset associations, and storing and retrieving assets from the repository.

Another piece of functionality of the Attestiv server is thus to serve as a search index to find the metadata on the blockchain 1022, 1110. This search capability should be provided by the Attestiv server, because not all ledgers have querying capabilities. In addition, the server may be used to group related assets. These related assets can be added to a group (we refer to as a record) by directing the mobile app for executing a workflow or by adding them directly (e.g., via manual steps). A record is simply a grouping of related assets.

Once all of the data and metadata specified in a guided workflow is in the repository and on the ledger and noted in the database, it is available to be used for asset validation 1100. This happens when a request is sent to the Attestiv server with a fingerprint that was calculated from some media (image, video, etc). That fingerprint is then looked up in the database. If found, the ledger address is retrieved and used to issue a request to the blockchain to retrieve the metadata about the media asset and return a status. If the calculated fingerprint matches the fingerprint retrieved from the distributed ledger, then the image is approved for validation. The status can be reported as approved, not found or unknown. In the viewer application 900, the status can then be used to display a corresponding icon 902, 904 on or adjacent to the asset along with the metadata.

Therefore, once the data is in the Attestiv system, it is possible to easily validate that content when it is displayed on the web or when a user views it in the Attestiv Viewer application 122. Using the Attestiv viewer application, a record can be selected and all the assets from the record displayed along with the appropriate validation icon.

One example of metadata may contain the following properties:
 1. fingerprint (calculated from the content) 734
 2. timestamp 722, 732
 3. location 736
 4. user ID 724
 5. weather (if applicable) 739
 6. encrypted fingerprint of metadata contents 734

Hosted Services Tier 106

The distributed architecture shown in FIG. 1 can also be thought of as having multiple tiers 102, 104, 106. The bottommost tier 106 are the hosted services. The distributed ledger exists here. It is here where the metadata is stored. In one implementation, the distributed ledger is accessed either directly and/or through the Attestiv server. The ledger may, for example, be a Factom or Ethereum blockchain.

Also within the hosted services tier 106 is a database 162. In some implementations, the primary database is mongodb, a nosql database, however in other implementations, a relational database may be used. The mongodb database holds all information related to users, organizations, organization configuration, file mapping data (for each file that is persisted to the filestore), records, ledger configuration information, client requests, question sets, and each transaction that is written to the blockchain.

Server Tier 104

The next tier upwards is the server tier, that is, the Attestiv server. The server may be implemented as a set of microservices which run in conjunction with one another. The microservices in this tier include a core service which supports the mobile application and the metadata logic which persists to the blockchain, a file service which writes files to the configured destination in the repository, an authentication and configuration service which authenticates users and handles REST requests for configuration APIs. The microservices may be implemented using node.js. In one approach, all of the microservices run within the same node process or service instance; however it is also possible for the server to be implemented as multiple instances, each responsible for executing one or more of the microservices.

The server tier may also include a cluster of one or more web servers which are the first receivers of any http requests. These web servers will handle all static data/file requests and will be configured to forward all REST requests to the BFF where they will then be forwarded to the actual handling service.

Ledger Abstraction Layer 142

For Attestiv to support multiple distributed ledger implementations, it may be helpful to to abstract out all of the blockchain operations into an API that is not specific to any one distributed ledger implementation. With that approach, modules are provided that execute the specifics for each supported blockchain implementation.

For example, in one approach, Factom is an initial default implementation for the blockchain abstraction layer. However, a customer organization can later configure additional blockchain implementations for their data, such as Ethereum or IBM Hyperledger. In that case, the Attestiv service then exposes another ledger abstraction layer for the Ethereum and/or IBM hyperledger.

Data Store Compatibility Layer 141

Because Attestiv supports writing file content to multiple locations depending on the customer choice, similar to the blockchain abstraction layer, a data store access abstraction layer can be provided. This service abstracts out the functions to write files to a destination, with modules provided for each implementation. For example, a module may be provided for S3, another for an RMS, and still another for a customer's private storage. The API for the data store access layer is generic, and not specific to any implementation. In some implementations, a file service abstraction layer is not provided, and Attestiv simply writes and reads to a server (or a service's) local file system.

Communication Between Services/Service Mesh

Microservices need to be able to communicate with one another to accomplish certain tasks. This communication can take the form of a messaging queue or something more formal such as a service mesh.

Organization Configuration

It is desirable for different customers to be able to configure their Attestiv application to suit their specific needs. Therefore, configuration settings are kept in the database, and exposed so that they can be changed by a customer. These settings determine specifically how the mobile application runs (e.g., the logic for the customer's guided workflow(s)) and executes for that customer's users.

For example, mentioned above are some configuration settings for the blockchain and the file system service. These configuration variables can be set by each customer. In addition, these settings can be downloaded to the Attestiv mobile application 121 at user login time to allow the application to run to the customer's liking.

The following configuration variables may be stored:
1. Blockchain implementation
2. File System implementation
3. Photo expiration timeout
4. ClientRequest properties (email subject, body, expiration time, submissionAction, SFTP credentials when submissionAction is 'sftp')

Client Tier 102

The client tier includes the mobile application 121 and viewer application 122.

Client Process Workflow 300

Figure 2:
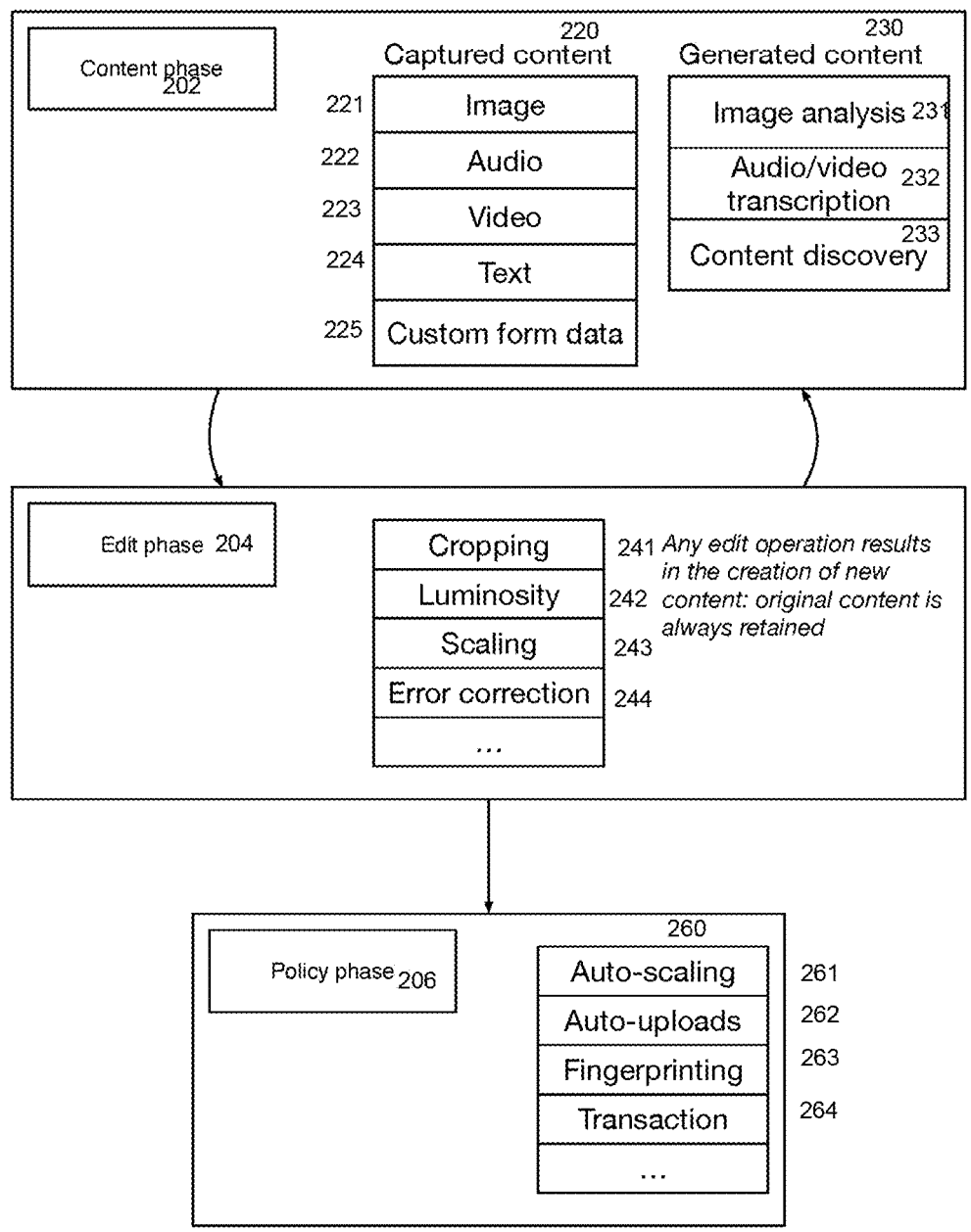
FIG. 2 illustrates three workflow phases.
Figure 3:
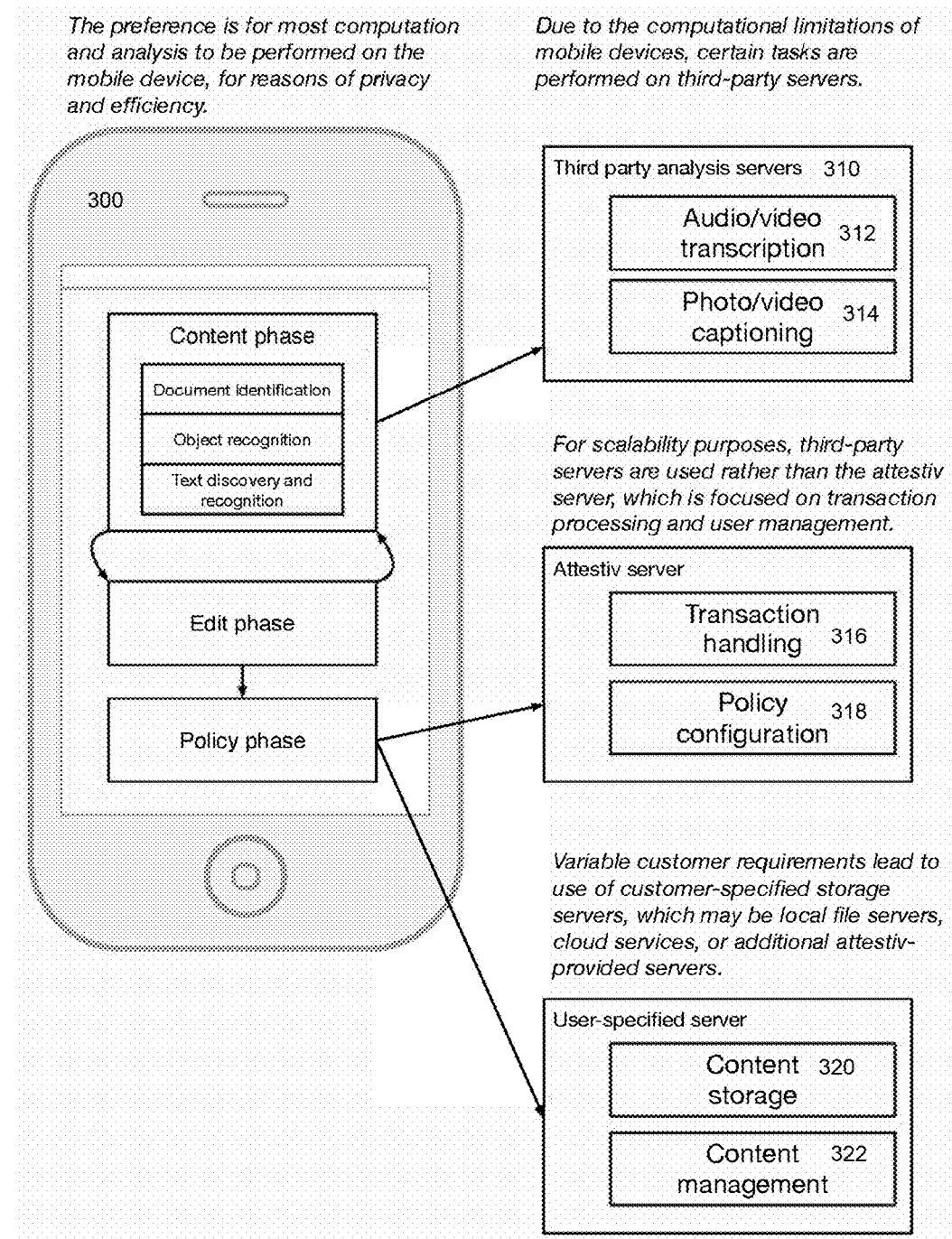
FIG. 3 shows more details of the three phases as an example workflow using a mobile device

The client level workflow 300 proceeds in three phases: content/capture 202, edit 204, and policy 206. FIG. 2 illustrates the functions performed in each phase. FIG. 3 shows more details of these phases and an example workflow using a mobile device, one or more third party analysis servers 310, the Attestiv server 140, and one or more content servers 320, 322.

More particularly, during the content phase, the user can choose to use capture methods embedded in the application, such as using the mobile device camera for video and images, and/or the microphone for audio, and/or the GPS for location. Ongoing processing during the capture phase can create generated additional content. This generated content may be created, for example, by identifying a document, or recognizing, discovering, and/or labeling text and/or objects in images, contacting third-party (analysis) servers for audio transcription, or obtaining pertinent contextual data from third parties (automatically or on request), such as but not limited to, context data provided from weather services (precipitation, visibility, temperature and similar environmental conditions), maps of the surrounding location (street maps, street views, maps with nearby landmarks, satellite imagery, topography and/or other relevant geolocation data, traffic data (such as posted speed limits and road construction and/or road condition data) and other context data generated from the captured content 231, 232, 233. The generated content 230 may be created using artificial intelligence or machine learning algorithms to analyze pictures, audios and videos. In addition, the user may manually generate additional content such as by entering text notes directly or via configuration-specific HTML forms 225.

In one preferred arrangement, most of the computation and analysis for generated content 230 is performed on the user's mobile device, for reasons of privacy and efficiency. However, certain tasks such as transcription, captioning, or object recognition may be performed on third-party analysis servers.

Workflow in the capture application may also be guided by an automated process, or enhanced by the use of voice control. For example, a police officer using the application to take pictures and statements at a crime system has the priority of maintaining situational awareness, which can be significantly hampered by the need to adjust settings on their phone or even just by using two hands to take a picture. By using their voice to trigger actions on the phone, like saying "snap" when they want to take a picture, both one of their hands is freed, and their gaze can be directed away from the phone if necessary.

All captured and generated content is preferably stored in its original form.

However, during an edit phase 204, copies of that original form of the content are made for editing. Editing may involve cropping or scaling an image, or adjusting its luminosity, or in the case of a document, correcting errors (e.g., 241, 242, 243, 244). It is important to users that they should be able to make at least limited changes to the content they have captured 220 or created, whether for practical reasons (brightening or zooming in on a scene to better view details), aesthetic reasons (correcting spelling errors in text notes), or efficiency reasons (scaling down a large picture to display on a web site). All edits that are made are tracked and data about the changes is included in the transaction.

In each case, the original content is preserved with a map to its edited versions, so that if at any point the authenticity of the edited content is challenged, the original can be used as a reference. The ability to edit content but in an auditable, provable way is an important part of the Attestiv server's functions.

An original content item, such as a photograph taken by a user intending to sell an item in the picture, may be quite large: typical iPhone photographs are eight megapixels and may consume several megabytes of storage space. Additionally, the hypothetical e-commerce user may not wish to include all of the original image in order to display the item for sale, and would prefer to crop the background out. By using the Attestiv app to crop and scale the image, the edited version remains verifiable in, for example, e-commerce web sites, the history of the changes can be tracked, and the original can be provided and verified on demand. But the web site can show an image that provides enough detail to gain the trust of the end-customer, while presenting it in an efficient and aesthetically pleasing way.

Figure 4:
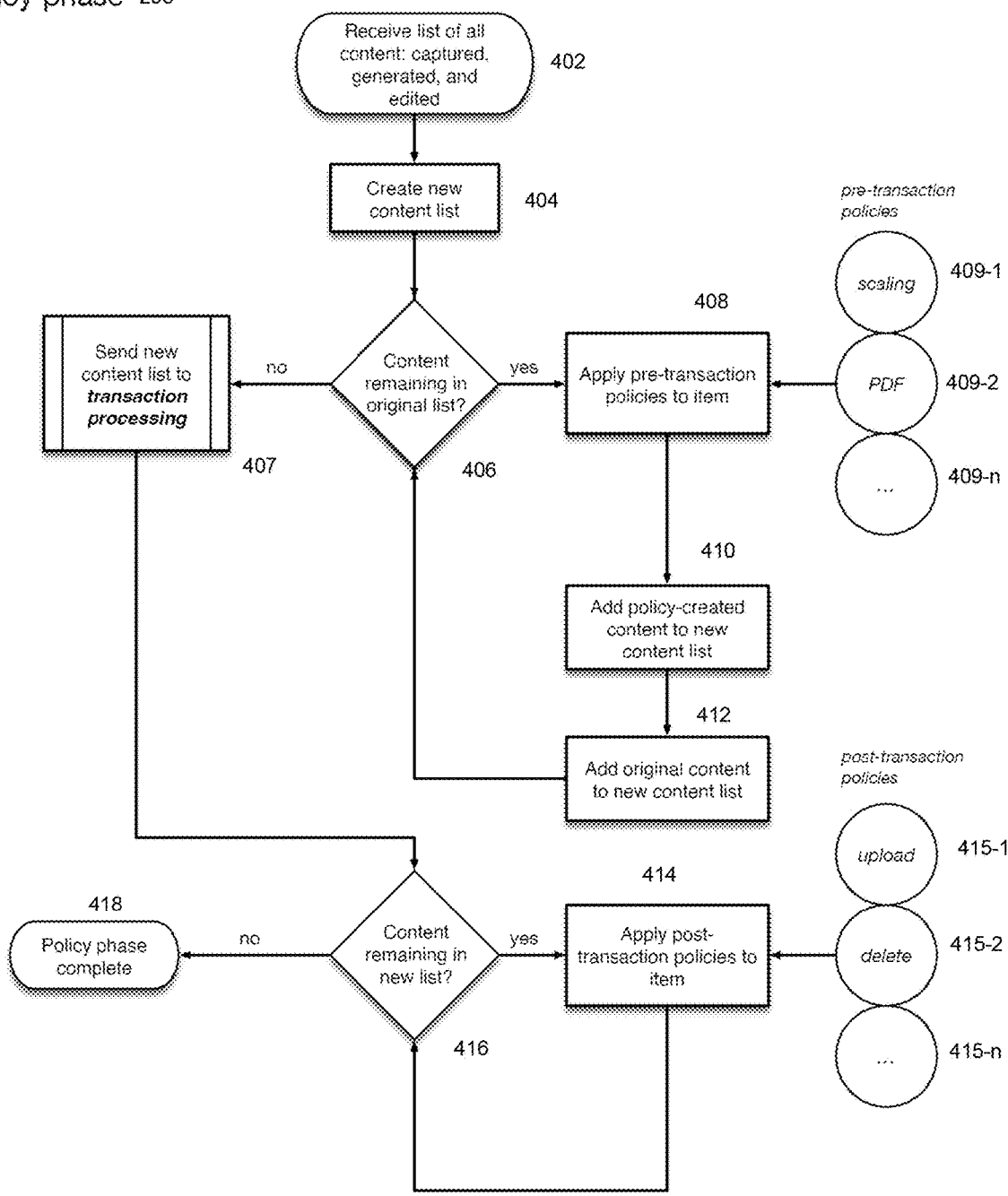
FIG. 4 illustrates a policy phase in more detail.

FIG. 4 illustrates the policy phase 206 in more detail. First, a list of items captured, generated and edited content is received 402. Next a new content list is created 404. While any content is remaining in the list, then pre-transaction policies are applied to each item 408. Policies may for example include scaling 409-1, generating PDFs 409-2 and other such policies 409-*n* described elsewhere in this document. Any policy created content is then added to the new content list along with any original content 410, 412. This process continues until no new content is remaining in the list 406.

At this point the content list is then sent to transaction processing 407. If any content is remaining in the list then any post-transaction policies are applied 414. Post transaction policies include uploading 415-1, deleting 415-2 or taking other actions 415-*m* as described elsewhere in this document. Once all content in the list has been processed 416, the policy phase is complete 418.

In one example automatic policies can be used to make generic edits to the content (with the same rules about change tracking and original preservation). For example, one such policy may apply auto-scaling 261 to a specific size for web display, or perhaps PDF creation based on textual content, or in another case automatic image quality enhancements like histogram normalization can be done for each content item. In addition, policies may be implemented as part of the logic in the guided workflow (as implemented in the application or the Attestiv server). For example, the guided workflow may require the user to collects all required content types for a particular scenario before the server will create and validate a transaction object.

Since these policies occur before the transaction is committed to the Attestiv server, they are appropriately enough called the "pre-transaction policies". These operations may typically be performed on the Attestiv server or by the application in coordination with the Attestiv server.

As mentioned previously, the Attestiv approach may also use a "transaction" to manage data, in which each content object item (and any related edited content) is fingerprinted (e.g., a unique identifier for the object is generated).

Figure 5:
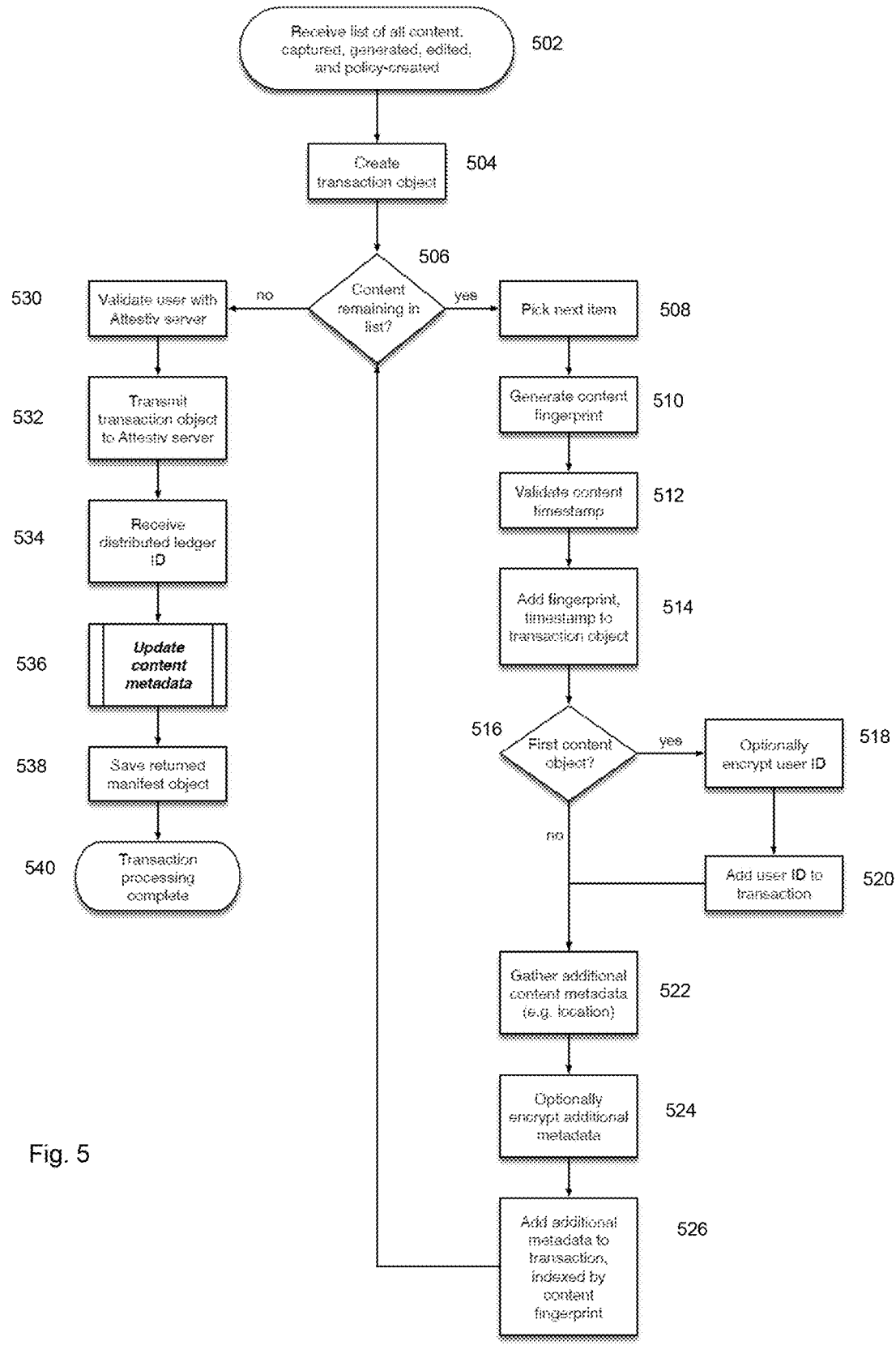
FIG. 5 shows an example transaction processing phase in more detail.

FIG. 5 shows an example transaction processing phase in more detail. First, a list of content captured, generated, edited and with any applied policies is received 502. A transaction object is then created 504 as follows. For each content object in the list, a fingerprint is generated 508, 510. A content timestamp is also validated 512. The fingerprint and timestamp are then added to the transaction object 514. If this was the first content object in the transaction 516, then optional data such as an encrypted user ID may be added to the transaction 518, 520. In any event, additional content metadata such as location, weather and other meta data types may be added to the object in the transaction 522, 524, 526. This additional metadata may be encrypted. This process continues until there are no more content objects remaining in the list 506.

At this point a number of steps may be performed such as validating the user 530, transmitting the transaction object to the Attestiv server 532 and receiving a distributed ledger ID 534 in return. Content metadata may be updated with this distributed ledger ID 536, 600 and saved on the manifest 538, 740. At this point transaction processing is complete 540.

Figure 7:
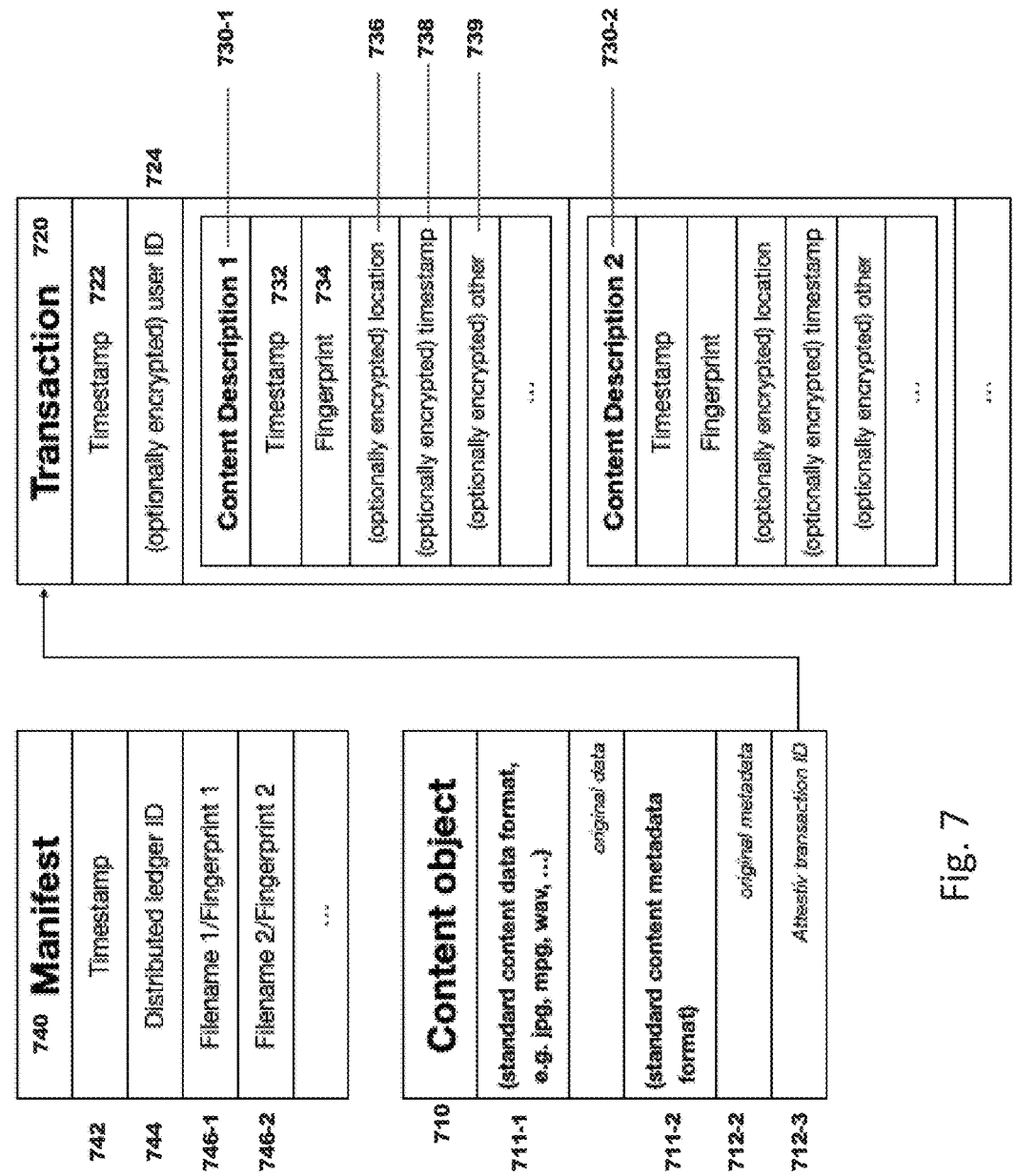
FIG. 7 illustrates an example data structure for a content object, a transaction, and a manifest.

Examples of content, transaction and manifest objects are shown in FIG. 7. A transaction object may include a timestamp and an optional encrypted user ID (note here the time stamp is for the overall transaction itself, and not the individual object). Each content object also includes a number of data elements such as its fingerprint and a time stamp. Other metadata such as location, encrypted timestamps, and other metadata may be included. Finally, a manifest object includes a timestamp 742, a distributed ledger ID 744 and then a list of filenames and fingerprints for objects on the manifest 746-1, 746-2.

The generated fingerprints are then bundled, along with a variety of other information including user ID, location, timestamps, and other arbitrary metadata, into a data structure (see FIG. 7).

The included metadata may depend on the type of captured data and indicate its context. For example, when the object is a photograph, embedded metadata in the image file such as aperture, flash, depth, shutter speed, filters, zoom, lens parameters, location, etc. may be extracted and stored as part of a transaction.

As explained previously, in some implementations, additional content may be generated for the captured content and stored as metadata, such as via text detection, optical character recognition, visual pattern recognition, or other artificial intelligence/machine learning methods applied to the captured content object.

That data structure is validated (based on customizable policy) to ensure that the contents have been created within a policy-specified time frame. Additionally, various encryption techniques may be used to protect potentially confidential data (such as location/timestamps).

Once validated, the content is transmitted to the Attestiv (authentication/indexing) server, which then inserts it into a type of distributed ledger (often of a type known as a blockchain) which has the specific properties of immutability and a high level of redundancy.

The Attestiv server receives back from the distributed ledger an address which can be used to later retrieve that transaction, which it then passes on to the Attestiv app at step 602. The app, in turn, embeds that address into every piece of content 600 which can store its own metadata, and also builds a manifest 606 containing the timestamp of the transaction, the blockchain address, and a list of every content item and its related edits by filename and content fingerprint.

Figure 6:
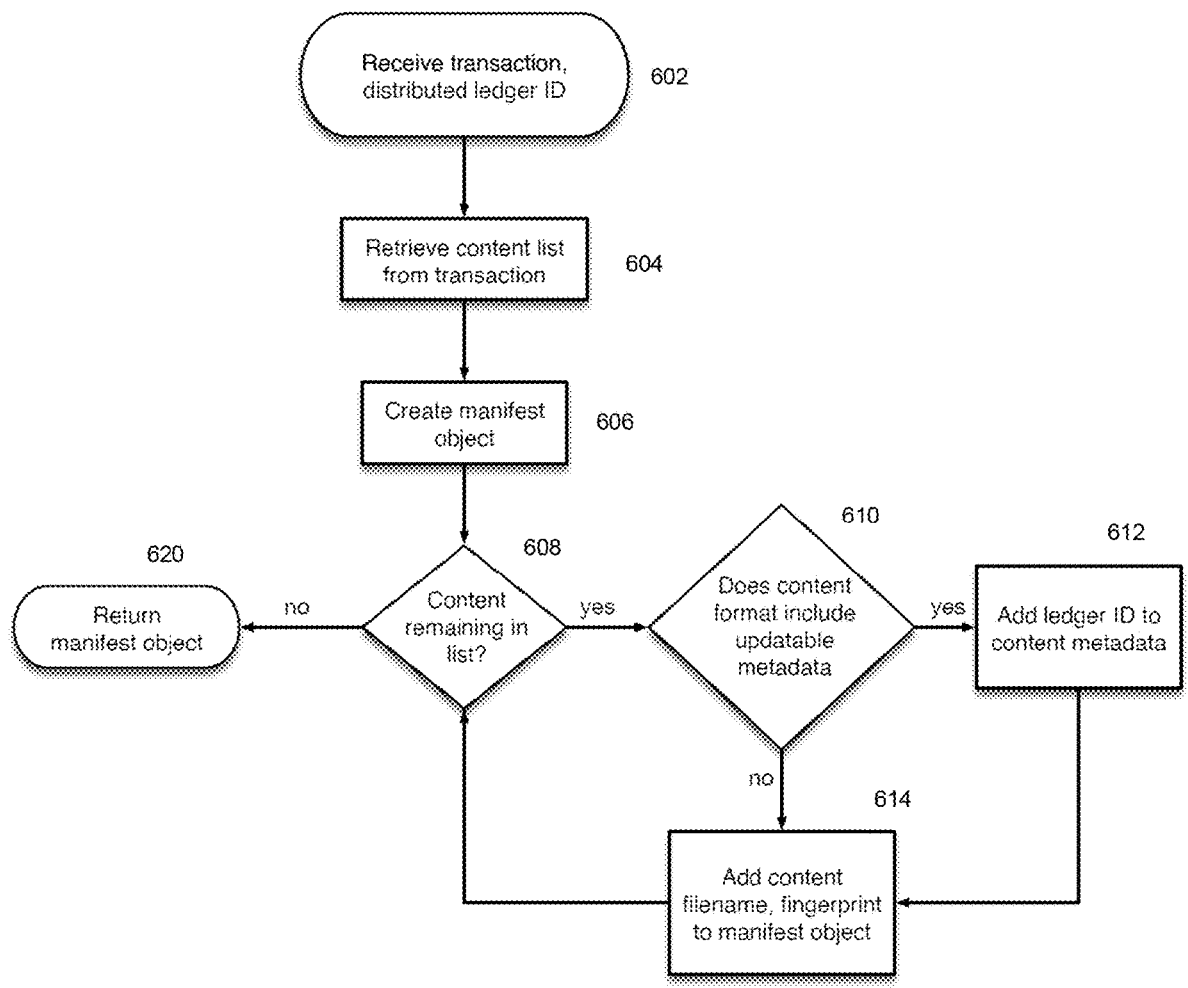
FIG. 6 illustrates example content metadata for a transaction.

Content metadata for a transaction may also be updated as per the flow in FIG. 6. A transaction to be updated is received, including its distributed ledger ID. The associated content list is then retrieved from the transaction 604. A new manifest object is then created. While there is content remaining in the list, a next step determines if the content format supports updatable metadata 610. If so, then the ledger ID is added to the content object metadata field(s) 612. However, if the content object does not itself support adding metadata, the file name and the fingerprint are added to the manifest for the object 614. For example some content objects, such as PDF files, do not permit modification of the metadata. However other objects, such as many image file formats, permit modification of their metadata. Finally when there are no more objects remaining in the list 608, the manifest object is completed 620, 711-1, 711-2, 712-3, 712-3. The policy phase may also include "post-transaction policies". These policies will typically include uploads of the contents, either for immediately publication (e.g. putting scaled images onto a website) or archive via a local file server. Other post-transaction policies may include automatic deletion, in which content is removed from the mobile device once it has been uploaded.

It should be noted that upload may also be a "pre-transaction policy" in cases in which preservation of content is considered more important than provability.

In one example implementation, the user downloads a mobile application for either the Android or iOS platforms. The user then uses the mobile application to capture multiple images within a designated and configurable timeframe, such as 15 minutes, which are then saved to the local smartphone storage. Again within the given timeframe, the user can select one or more of the captured images for the authentication process.

Each of the selected images is added to a content list in preparation for the transaction. An automatic scaling policy is applied, creating versions of the original images that are resized for display on a web site. Each of the scaled and original versions is fingerprinted and the fingerprint added to the transaction object, along with references to the corresponding original image. Timestamps and user information are added to the transaction object.

The mobile application then authenticates the user to the Attestiv web server, and if successful, transmits the completed transaction object. In this embodiment, the server will compare its current time with the timestamp provided in the transaction, and reject transactions that differ by a certain threshold, which may for example, be 15 minutes. If the transaction is not rejected, then the server commits it to a distributed ledger (such as Factom, Ethereum, or Hyperledger).

Following the successful transmission of the transaction object to the Attestiv server, the mobile application stores a transaction ID in the EXIF metadata of each of the images referenced in the transaction object. It is worth noting that at this point, these image files are still stored only on the user smartphone. After this modification, this embodiment applies an optional storage policy, which transmits each file to the Attestiv server, which then stores the images in an Amazon S3 bucket for future retrieval. Another optional storage policy in this embodiment will immediately delete the image files from the local smartphone.

In another embodiment, the mobile smartphone application includes additional workflow logic, which may, for example, request photographs of specific objects, e.g. driver's licenses for use in automotive accident processing. Those images are both classified to ensure that they contain the requested object and processed to extract specific fields, e.g. driver name, license number, and address. The extracted fields can be included in the transaction along with the driver's license photographs, and can also be used to populate a crash exchange form which can also be authenticated as a part of the same transaction.

In yet another embodiment, the above-described logic can be embedded in a web page which is downloaded by the user on-demand, and which can include a more elaborate and customizable workflow, such as home inspection. In this case, the web page guides the user to take specific pictures in accordance with the requirements laid forth by the entity requesting the inspection. The authentication logic remains the same, excepting that user ID used to authenticate to the server is provided by the requesting entity. Additional variations include the use of object recognition algorithms and services to ensure that the pictures taken by the user correspond to the requirements of the requesting entity.

In any of the workflows described, the server may contain an additional policy to verify that the contents of the transaction match the contents of the workflow, rejecting transactions in which correct objects and information cannot be recognized 301, 302, 303.

In some use cases, such as insurance claim self-service inspection, the expectation is that the applications run on untrusted customer devices. However, heuristics can be used to reject submissions to the server based on the following:

a. Expiration of request (administrator selectable expiration interval)

b. Detection of tampered app, with an option to block device indefinitely c. Detection of substantial time differential between the time of capture of a photos/video and the time of fingerprint commit on the blockchain d. Cross-check failed between expected location and GPS location, which may include check against cellular or WiFi-based IP address for geolocation anomalies e. Detect orientation/direction anomalies of phone while picture is taken (i.e. facing downward)

f. Liveness detection failure (for dual pictures and/or video)

g. Front camera image verification (selfie)

h. Comparing against trusted satellite imagery, floor plans, across pictures, etc.

Figure 8:
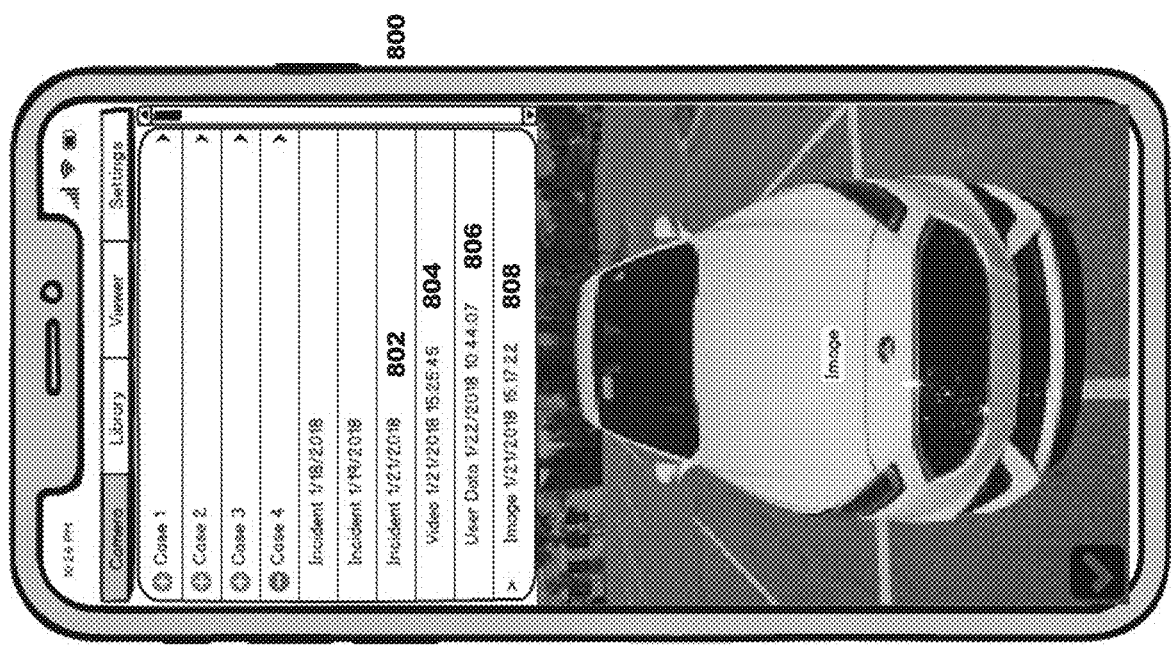
FIG. 8 is an example screenshot of a mobile application.

FIG. 8 is an example screenshot of the mobile application 121. Here the user is an insurance field investigator documenting an automobile accident. The user, who has been guided by the application, has created three pieces of content including a video, an image of the vehicle, and text related to the incident which includes driver names, addresses, and driver license numbers. Note the icon in the lower left-hand corner (i.e. a check mark) indicates that the image has been validated by the system.

Figure 9:
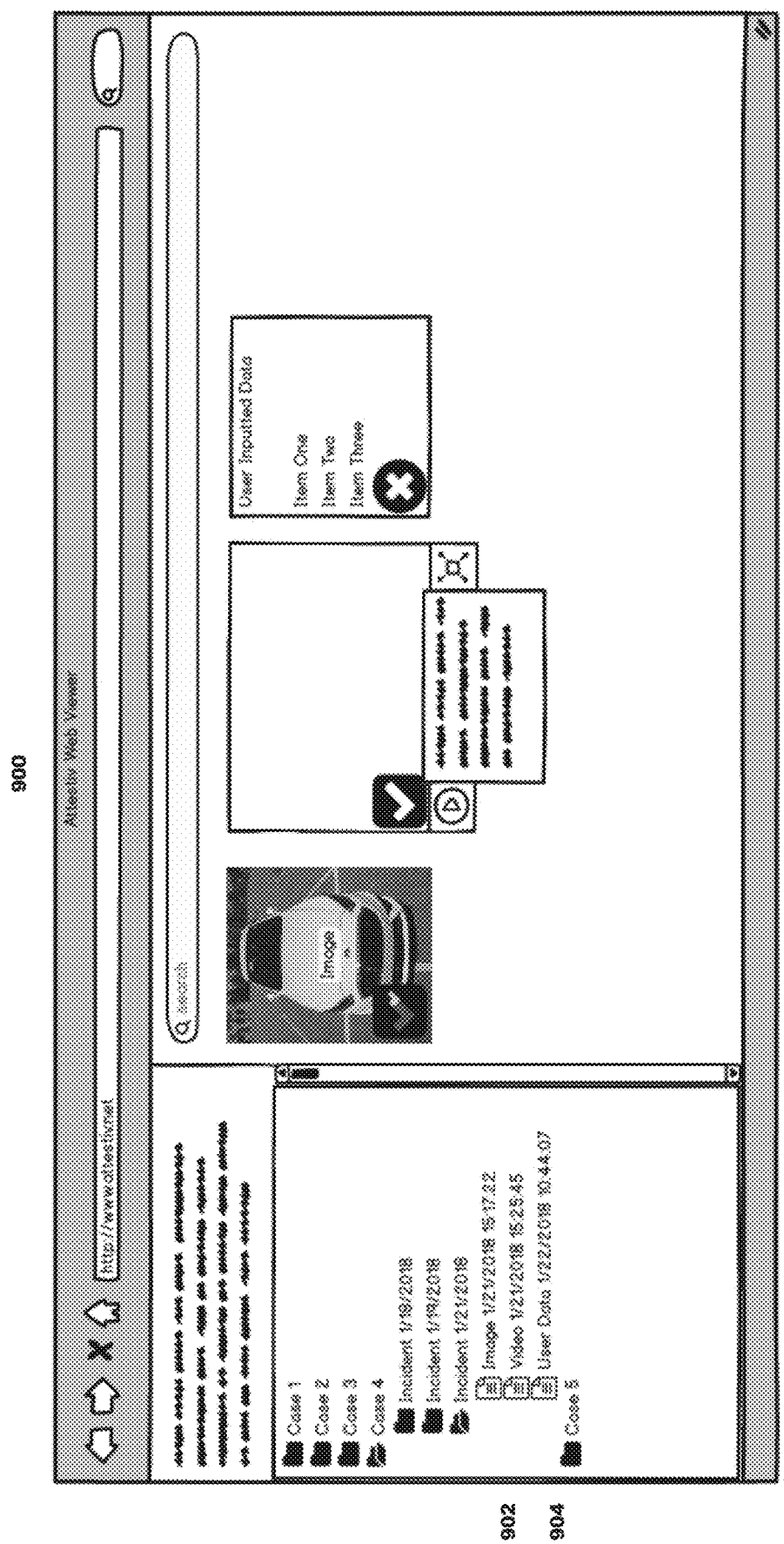
FIG. 9 is an example screenshot of a web viewer application.

FIG. 9 is a screenshot of the viewer application 122, which may be operated for example, by a claims adjuster in the insurance company's home office via a web browser. Here the adjuster has retrieved a record for the incident. The adjuster sees the image of the vehicle as being validated, and can be confident that it has not been altered. However, another object—the form file containing user inputted data related to the incident—has not been validated, and its corresponding state is indicated by an X icon.

Figure 10A:
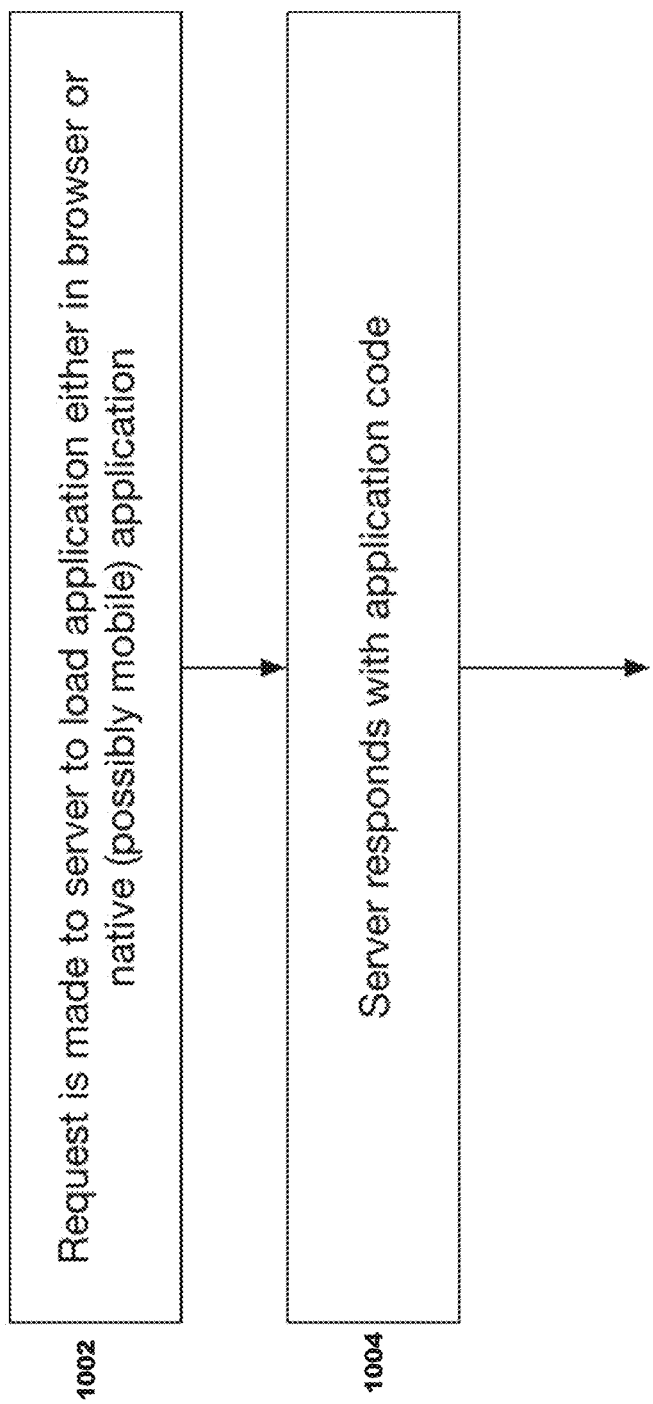
FIGS. 10A, 10B and 10C show a viewer application process flow in more detail.
Figure 10B:
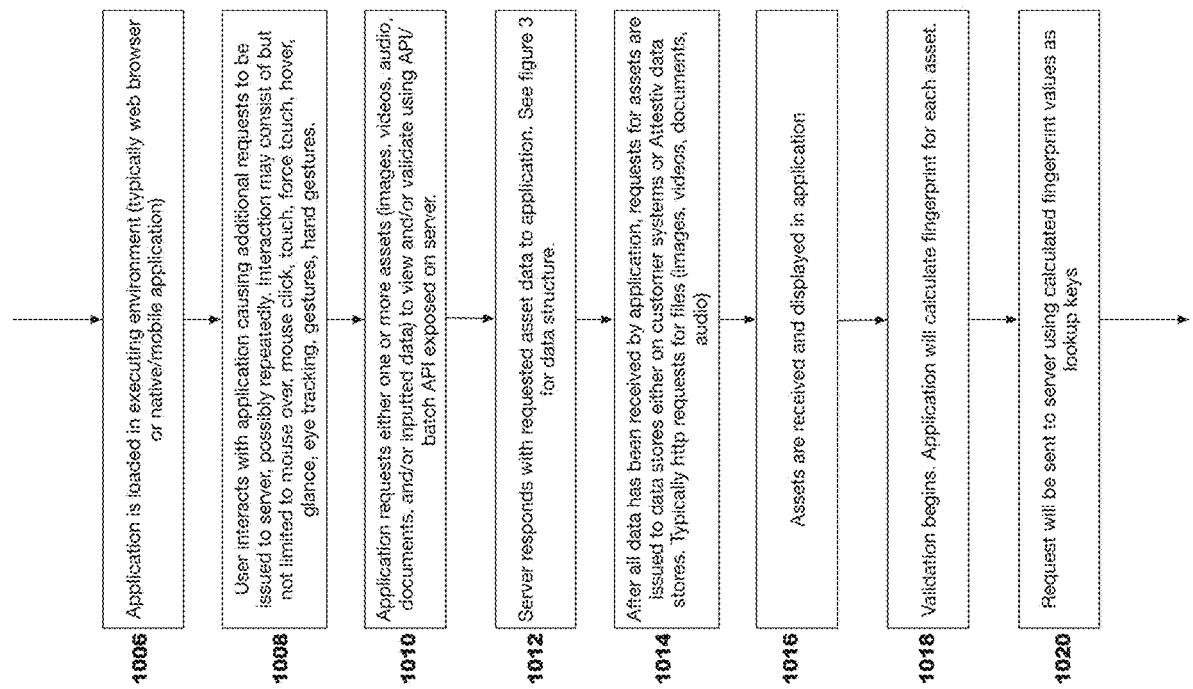

The flowcharts in FIGS. 10A, 10B and 108C describe the viewer application 122 flow beginning with requesting 1002, receiving 1004 and loading 1006 the application in either a browser or a native application (mobile or desktop).

Generally speaking, as a user interacts 1008 with the application, requests 1010 are sent to an Attestiv server 140 to retrieve metadata about assets previously persisted 1106. Assets may include images, video, audio, documents, or other data. Once the metadata is returned to the viewer application, the actual assets are retrieved from storage 1014, 1016, 1104, either from customer servers or the Attestiv servers. Once assets are retrieved, the viewer application begins a validation process by calculating 1018 fingerprint(s) for the asset(s) 1108 and issuing a lookup 1020 on Attestiv server(s) 140 by using the calculated fingerprint as a key. The lookup executes 1022 on the Attestiv server 140 to find an immutable distributed ledger address 1024 via the supplied key for each asset.

The above is a key point in this design. The calculated fingerprint of an asset is mapped to an address within the immutable distributed ledger, and the distributed ledger in turn contains the original metadata (but NOT the content itself). This allows us to lookup immutable data that was persisted earlier simply by calculating the fingerprint. Lookup may be via individual query, batched, or via APIs or batch APIs. Data returned from the Attestiv server 140 is the original calculated fingerprint 1026, 1028.

If the original calculated fingerprint when the asset was created and current calculated fingerprint are equal 10302, then positive watermark is displayed over the image, otherwise negative watermark is displayed over the image 1032, 1114. Note that watermarks may be displayed in a number of ways including for example, an alert that certain assets are invalid. This could be in the form of an alert message being displayed over the entire window or screen. Also, a single watermark may relate to a group of objects versus individual watermarks on each object. That way, different views of grouped objects may enable identification that at least one may have been altered. A watermark may or may not partially obscure the visual rendering of the object or its representation.

Figure 10C:
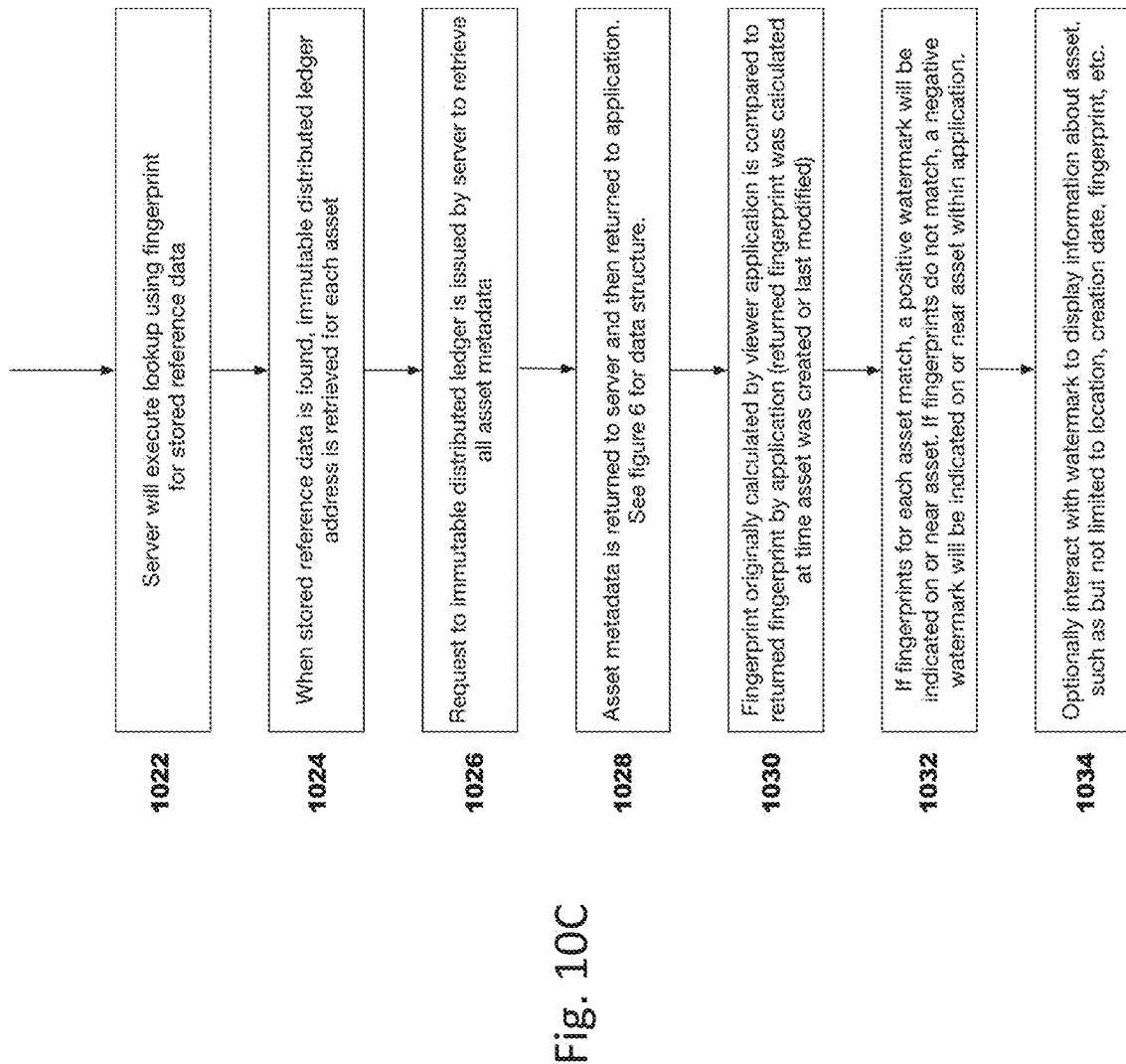

Now turning attention to FIGS. 10A, 10B and 10C more particularly, an initial request 1002 is made to a server to load the application (either the mobile application or the web browser application). The server then responds 1004 with the applicable code for the application.

Once the application is loaded 1006, execution can begin and the user is then able to interact 1008 with the application. These server interactions may of course include things such as keyboard inputs, voice, mouse overs, clicks, touches, force touch, eye tracking gestures or hand gestures. These inputs are then used to formulate requests 1010 that one or more assets be reviewed and/or validated.

The server then responds 1012 with the requested asset data, after it has been retrieved from the data repository (which be customer private data store or cloud data store). These requests 1014 may be handled via HTTP or other appropriate protocols. Any retrieved assets are then received 1016 by the application. At this point validation begins 1018 whereby for example the application will calculate a fingerprint from the retrieved asset. A request 1020 is then sent to the server using the calculated fingerprint. The calculated fingerprint is then used at 1022 as a lookup key, with the server then executes a lookup 1024 using the fingerprint to access the stored reference data, which is then used to access the immutable distributed ledger at 1026. A request is then made to retrieve the asset by the server, and the asset is returned to the application 1028, including the fingerprint that was created at the time the record for the asset was created or last modified.

At this point the two fingerprints are compared 1030. If both of these fingerprints for the asset match 1032, then positive watermark can then be indicated on or near a rendering of the asset in the viewer application. If the fingerprints do not match, and negative icon is displayed. The user may optionally interact 1034 with the status icon to view more of the metadata, such as its timestamp. location, creation date, fingerprint detail and the like.

Figure 11:
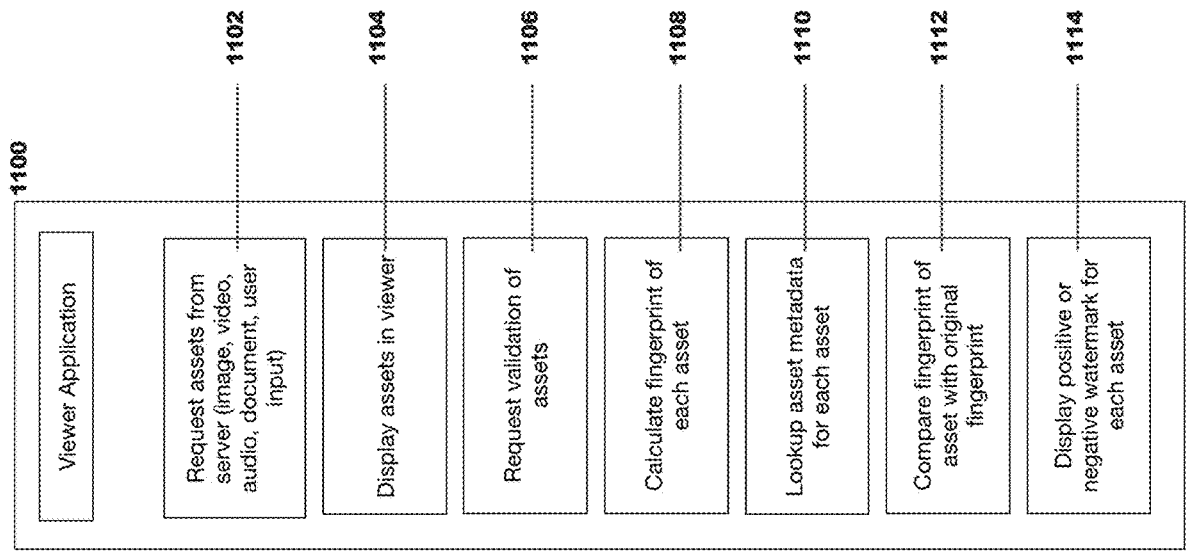
FIG. 11 is another viewer application flow.

FIG. 11 shows the Viewer Application Flow. As explained previously, the viewer application 122 may be used to load a set of asset data. Once the asset data is returned to the viewer application, each asset is requested and then loaded into the app. Finally, validation begins and the fingerprint of each asset is calculated, looked up on the Attestiv server, and then compared to the originally calculated fingerprint. If fingerprints match, a positive watermark is displayed (e.g., a checkmark), otherwise a negative watermark (e.g., the letter "x") is displayed.

Viewer Application File(s) Format—The data below is a sample record of three (3) files to be displayed and verified

```
[
  {
    "fingerprint": "598af47eef710123680bdd4ca5692fd182ccdeeb637350745d11dcecd1603aac",
    "filepath": "images/Attestiv/E8559C93-ABB5-4403-9589-86E03D9E90E1.jpg",
    "creationDate": "2018-04-14T20:24:18.562Z",
    "username": "joe"
  },
  {
    "fingerprint": "f6fd6c6c7e02b2b97c194efbdf24a0f9cc78eda73d12b968796c979e38837d10",
    "filepath": "images/Attestiv/8BB802F9-DDFB-437F-8D7F-FD6D2675FBAE.jpg",
    "creationDate": "2018-04-11T21:46:47.536Z",
    "username": "john"
  },
  {
    "fingerprint": "3ac780db29b673ded100d2fff8070c8bb69a834fd43428936390c3da00348480",
    "filepath": "images/Attestiv/73D9CC5A-D714-41A4-BB7C-16CFCC353BC9.jpg",
```

```
    "creationDate": "2018-04-11T21:46:18.045Z",
    "username": "john"
  }
]
```

Figure 12:
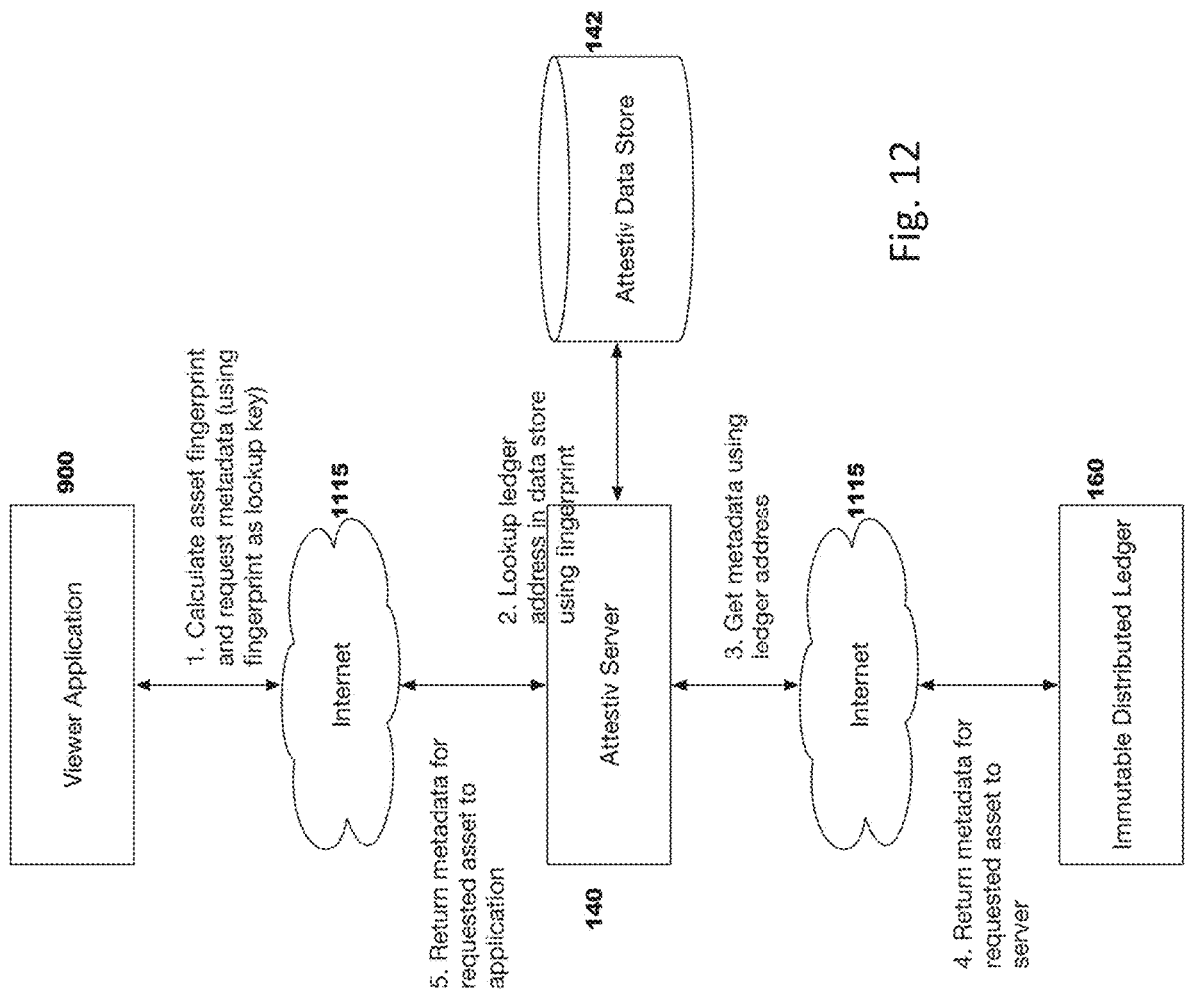
FIG. 12 is a flow of requests between the viewer application, a server, a data store and an immutable ledger.

FIG. 12 shows an example flow of requests between the viewer application 121, the Attestiv server 140, the data store (repository) 148, and the immutable ledger 160, to lookup the immutable metadata for a given asset using only its calculated fingerprint. First, the application calculates an asset fingerprint, and makes a request to retrieve metadata for the asset using the fingerprint as a lookup key. This request travels over a network (such as the Internet) and arrives at the Attestiv server. The Attestiv server then uses the fingerprint to access the data store. The data retrieved by the data store includes metadata, which is then supplied to the immutable distributed ledger. Metadata is in turn then forwarded to the back through the network to the viewer application.

Distributed Ledger Validation Response—When requesting the original metadata for an asset from the server, the response may take the format below. This example includes a record data for three (3) photos containing the time they were taken, the location where taken, and the calculated fingerprint of the image. This is an example of the metadata which may be stored in the immutable distributed ledger 160.

```
[
  {"parentUUID":"",
   "timestamp":"2018-04-05 20:08:50 +0000",
   "UUID":"34F82987-9FE5-4A8E-A63F-BEE302A8B80E",
   "fingerprint":"a372010ee85f72cbb8cf6ae2cbbe1955394a1569830e7ecf262f43df7cbef18d",
   "location":"Oak Hill Rd, Mendon, MA, United States"
  },
  {"parentUUID":"",
   "timestamp":"2018-04-05 20:08:44 +0000",
   "UUID":"3B46B8AB-7AF6-406A-953A-7BA0FF812E27",
   "fingerprint":"33af0106c89140f999aa3f90800f53f2c4cfc5e55b4f9ab9e1cadb4a8b832799",
   "location":"Oak Hill Rd, Mendon, MA, United States"
  },
  {"parentUUID":"34F38487-9FE5-4A8E-A63F-BEE302A8B80E",
   "timestamp":"2018-04-05 20:08:50 +0000",
   "UUID":"2373723B-441A-4763-8258-4546229F9BDB",
   "fingerprint":"694a83fe51cbc09a046be920cfa1ee8d89d011db66ed41dc582e6de484af1317",
   "location":"Oak Hill Rd, Mendon, MA, United States"
  }
]
```

Stored Asset Metadata—The data below is an example of the stored metadata for an asset. Represented below is a batch (bulk) transaction sent from the mobile application 121 to store metadata for multiple assets.

```
{
"uuid":"40E3F36A-E0D7-4D97-B505-A68B564569B8",
"photos":[
  {
  "parentUUID":""
  "timestamp":"2018-04-05 20:08:50 +0000",
  "UUID":"34F38487-9FE5-4A8E-A63F-BEE302A8B80E",
  "fingerprint":"a372010ee85f72cbb8cf6ae2cbbe1955394a1569830e7ecf262f43df7cbef18d",
  "location":"Pine Rd, Boston, MA, United States"
  },
  {
  "parentUUID":"",
  "timestamp":"2018-04-05 20:08:44 +0000",
  "UUID":"2B86B8AB-7AF6-406A-953A-7BA0FF812E27",
  "fingerprint":"33af0106c89140f999aa3f90800f53f2c4cfc5e55b4f9ab9e1cadb4a8b832799",
  "location":"Pine Rd, Boston, MA, United States"
  },
  {
  "parentUUID":"34F38487-9FE5-4A8E-A63F-BEE302A8B80E",
  "timestamp":"2018-04-05 20:08:50 +0000",
  "UUID":"1093723B-441A-4763-8258-4546229F9BDB",
  "fingerprint":"694a83fe51cbc09a046be920cfa1ee8d89d011db66ed41dc582e6de484af1317",
  "location":"Pine Rd, Boston, MA, United States"
  },
  {
  "parentUUID":"2B86B8AB-7AF6-406A-953A-7BA0FF812E27",
  "timestamp":"2018-04-05 20:08:44 +0000",
```

```
    "UUID":"E05F145F-A7DB-4498-A963-A5FDEA5C89B3",
    "fingerprint":"c9488dfeb6cfb66428f5e7c90bee20ef7ddc9f79878d7b940a94a8801139e02e",
    "location":"Pine Rd, Boston, MA, United States"
    }
  ],
  "timestamp":"2018-04-05 20:08:55 +0000",
  "location":"Pine Rd, Boston, MA, United States",
  "user":"john",
  "userOnServer":"john"
}
```

The foregoing description of example embodiments provides illustrations and description of example systems and methods for using a distributed ledger for proof of authenticity of a set of related digital content objects, and to validate retrieved objects using a distributed ledger, but is not intended to be exhaustive or to limited to the precise form disclosed.

It should be understood, however, that the embodiments described above may be implemented in many different ways. In some instances, the various data processing systems and devices described herein may each be implemented by a separate or shared physical or virtual general purpose computer having a central processor, memory, disk or other mass storage, communication interface(s), input/output (I/O) device(s), and other peripherals. The general purpose computer is transformed into the processors with improved functionality, and executes stored programs to perform the processes described above, to provide improved operations. The processors may operate, for example, by loading software instructions, and then executing the instructions to carry out the functions described. Network interface(s) allow the computer(s) to connect to various other computers and devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof. In some implementations, the computers that execute the processes described above may be deployed in a cloud computing arrangement that makes available one or more physical and/or virtual data processing machines via a convenient, on-demand network access model to a shared pool of configurable computing resources (e.g., networks, servers, storage, applications, and services) that can be rapidly provisioned and released with minimal management effort or service provider interaction. Such cloud computing deployments may sometimes be preferred as they allow multiple users to access computing resources. By aggregating demand from multiple users in central locations, cloud computing environments can be built in data centers that use the best and newest technology, located in the sustainable and/or centralized locations and designed to achieve the greatest per-unit efficiency possible.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block, flow and network diagrams may include more or fewer elements, be arranged differently, or be represented differently. It further should be understood that certain implementations may dictate the block, flow and network diagrams and the number of block, flow and network diagrams illustrating the execution of the embodiments be implemented in a particular way.

Other modifications and variations are possible. For example, while a series of steps has been described above with respect to the flow diagrams, the order of the steps may be modified in other implementations. In addition, the steps, operations, and elements may be performed by additional or other modules or entities, which may be combined or separated to form other modules or entities. For example, while a series of steps has been described with regard to certain figures, the order of the steps may be modified in other implementations consistent with the same or analogous principles. Further, non-dependent steps may be performed in parallel.

The invention claimed is:

1. A method comprising, at an authentication server:
receiving, from a mobile device, a transaction object, the transaction object including at least a reference to a content object, a fingerprint for the content object, and other metadata indicating at least a timestamp related to the content object;
inserting the fingerprint for the transaction object into a distributed ledger;
receiving a ledger address from the distributed ledger;
generating a manifest object containing the transaction object, the ledger address, and a list of the content object and its related edits;
storing the manifest object; and
wherein the transaction object further comprises an image content object, and a transformed image object that is a cropped or scaled version of the image content object, and a fingerprint for the transformed object.

2. The method of claim 1 additionally comprising:
storing the content object in an object repository that is not part of the distributed ledger.

3. The method of claim 1 wherein the object repository is one or more of
storage local to the authentication server;
private storage managed remotely from the authentication server; or
cloud storage service.

4. The method of claim 1 additionally comprising:
applying a policy to the content object prior to generating the manifest object.

5. The method of claim 1 additionally comprising:
storing the fingerprint with the content object in the object repository;
storing the ledger address in an index; and subsequently locating the content object by:
- sending the ledger address to the distributed ledger;
- receiving a fingerprint from the distributed ledger;
- sending the fingerprint to the object repository; and
- receiving the content object from the object repository.

6. The method of claim 1 wherein the transaction object further comprises edits to the content object.

7. The method of claim 1 wherein the content object is one or more
- sets of related videos or audio recordings;
- sets of related documents;
- sets of structured or unstructured user input data; or
- combinations thereof.

8. The method of claim 1 wherein the other metadata further includes machine generated metadata for a content object related to a time, location, user identifier, contextual data such as environmental data, weather, or nearby events related to when the content object was captured.

9. The method of claim 1 wherein the other metadata further includes machine readable information generated from the content object.

10. The method of claim 1 wherein the manifest object further arranges multiple content objects as structured storage of captured content files into referenceable records; and the method further comprises:
subsequent indexing or searching of content objects.

11. The method of claim 1 wherein the content object is captured and/or edited via a structured workflow.

12. The method of claim 4 wherein the policy is a pre- or post-transaction policy.

13. The method of claim 1 additionally comprising:
encrypting one or more parts of the transaction object.

14. The method of claim 1 additionally comprising:
generating an additional content object by applying text detection, optical character recognition, object detection or other artificial intelligence/machine learning to the content object.

15. The method of claim 1 wherein the content object is a digital image or video file captured with a mobile device from which the content object was received.

16. The method of claim 1 additionally comprising:
accessing the object repository via an abstraction layer that interfaces to two or more types of local storage, private storage, or cloud storage.

17. The method of claim 1 additionally comprising:
accessing the distributed ledger through an abstraction layer that interfaces to two or more types of distributed ledger services.

* * * * *